United States Patent
Pergantis et al.

(10) Patent No.: US 11,022,516 B2
(45) Date of Patent: Jun. 1, 2021

(54) TOOL FOR USE IN PROVIDING A SEAL ON A TUBE END TO ALLOW A PRESSURE TEST

(71) Applicant: United Technologies Corporation, Farmington, CT (US)

(72) Inventors: John Pergantis, Manchester, CT (US); Zachary Sears, Portland, CT (US); Anthony Valenti, Wolcott, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 120 days.

(21) Appl. No.: 16/361,279

(22) Filed: Mar. 22, 2019

(65) Prior Publication Data

US 2020/0300723 A1    Sep. 24, 2020

(51) Int. Cl.
| | |
|---|---|
| *G01M 15/14* | (2006.01) |
| *G01M 3/28* | (2006.01) |
| *F01D 21/00* | (2006.01) |
| *G01M 3/02* | (2006.01) |

(52) U.S. Cl.
CPC ......... *G01M 3/2815* (2013.01); *F01D 21/003* (2013.01); *G01M 3/022* (2013.01); *G01M 3/025* (2013.01); *F05D 2260/83* (2013.01)

(58) Field of Classification Search
CPC ....... G01M 3/022; G01M 3/025; G01M 15/14
USPC ...................................................... 73/112.01
See application file for complete search history.

(56) References Cited

U.S. PATENT DOCUMENTS

| | | | |
|---|---|---|---|
| 3,884,070 A | 5/1975 | Windle | |
| 4,046,006 A * | 9/1977 | Dufrene | E21B 47/117 73/152.51 |
| 2010/0043536 A1 | 2/2010 | Sleijpen et al. | |
| 2012/0024045 A1 | 2/2012 | Herzog et al. | |
| 2013/0000051 A1* | 1/2013 | Cleland | B26D 3/169 7/128 |
| 2019/0032770 A1 | 1/2019 | McCune | |

FOREIGN PATENT DOCUMENTS

| | | |
|---|---|---|
| DE | 3532609 A1 | 3/1987 |
| DE | 20101526 U1 | 8/2001 |

OTHER PUBLICATIONS

European Search Report for EP Application No. 20164862.3 dated Aug. 24, 2020.

* cited by examiner

*Primary Examiner* — Eric S. McCall
(74) *Attorney, Agent, or Firm* — Carlson, Gaskey & Olds, P.C.

(57) ABSTRACT

A method of providing a pressure test on a tube to identify leakage includes the steps of (a) mounting a clamp on a tube adjacent an end and such that a plug which is part of the tool is positioned to plug an inlet into the tube, (b) actuating the tool to cause the plug to provide a fluid tight seal in the inlet, and (c) applying a source of pressure to the tube, and monitoring the pressure within the tube, and identifying a leak should the pressure drop more than a predetermined amount in a particular period of time. A tool for use in providing a seal on a tube end to allow a pressure test is also disclosed.

6 Claims, 8 Drawing Sheets

TOOL FOR USE IN PROVIDING A SEAL ON A TUBE END TO ALLOW A PRESSURE TEST

BACKGROUND

This application relates to a tool including a plug that is utilized to pressure test a component on a gas turbine engine and to a method of pressure testing the component.

Gas turbine engines are known and typically include a fan delivering air into a bypass duct as propulsion air. The fan also delivers air into a compressor where it is mixed with fuel and ignited. Products of this combustion pass downstream over turbine rotors driving them to rotate.

As can be appreciated, a gas turbine engine is a very complex system. Lubricant is required at any number of locations. One such location is to bearings which support the rotating turbine rotors. A scavenge system returns the lubricant after it has lubricated the bearings. The scavenge system includes a scavenge tube which extends through housings. There are seals to seal the scavenge tube within the housings. Also, housings, fittings and tubes may leak. As examples, braze joints and nut fittings may leak.

It is difficult to test the scavenge tube for leakage and, in particular due to the crowded environment in which at least one scavenge tube sits.

SUMMARY

In a featured embodiment, a method of providing a pressure test on a tube to identify leakage includes the steps of (a) mounting a clamp on a tube adjacent an end and such that a plug which is part of the tool is positioned to plug an inlet into the tube, (b) actuating the tool to cause the plug to provide a fluid tight seal in the inlet, and (c) applying a source of pressure to the tube, and monitoring the pressure within the tube, and identifying a leak should the pressure drop more than a predetermined amount in a particular period of time.

In another embodiment according to the previous embodiment, a lever on the tool is pivoted to cause the plug to be moved axially into the inlet.

In another embodiment according to any of the previous embodiments, the inlet is positioned adjacent obstructions.

In another embodiment according to any of the previous embodiments, the obstructions include at least a crossover tube.

In another embodiment according to any of the previous embodiments, the tube returns oil to an oil sump.

In another embodiment according to any of the previous embodiments, the method identifies a leaking seal, housing, tube, joints or connections.

In another embodiment according to any of the previous embodiments, the tube is a tube end connected to a bearing support and a scavenge tube is connected to a portion of a housing in communication with the tube end and the pressure source is applied to a remote end of the scavenge tube relative to the tube end.

In another embodiment according to any of the previous embodiments, the tube is part of a gas turbine engine.

In another embodiment according to any of the previous embodiments, the housing is a turbine intermediate case in the gas turbine engine.

In another embodiment according to any of the previous embodiments, the tool includes forceps locks, which locks clamps on an outer peripheral surface above of the tube end prior to the movement of step (b).

In another embodiment according to any of the previous embodiments, after the lever is pivoted, a pin is inserted to lock the lever at the pivoted position.

In another embodiment according to any of the previous embodiments, the inlet is positioned adjacent obstructions.

In another embodiment according to any of the previous embodiments, the tube returns oil to an oil sump.

In another embodiment according to any of the previous embodiments, the method identifies a leaking seal, housing, tube, joints or connections.

In another embodiment according to any of the previous embodiments, the tube is a tube end connected to a bearing support and a scavenge tube is connected to a portion of a housing in communication with the tube end and the pressure source is applied to a remote end of the scavenge tube relative to the tube end.

In another embodiment according to any of the previous embodiments, the housing is a turbine intermediate case in the gas turbine engine.

In another embodiment according to any of the previous embodiments, the tool includes forceps locks, which lock clamps on an outer peripheral surface above the tube prior to the movement of step (b).

In another featured embodiment, a tool for use in providing a seal on a tube end to allow a pressure test includes a pair of forceps and a lock for locking the forceps at a particular location. Each of the forceps move with a semicircular clamp. A plug is mounted to the tube and axially moveable relative to the clamps, and a structure for actuating the plug to move axially to seal in a structure to be pressure tested.

In another embodiment according to the previous embodiment, a lever is pivoted to cause the plug to move axially.

In another embodiment according to any of the previous embodiments, the lever rotates an actuation structure relative to a cam surface, and such that a link for moving the plug is caused to move axially by rotation of the actuation structure to, in turn, cause the plug to move into and out of an opening on a structure to be tested.

These and other features may be best understood from the following drawings and specification.

DETAILED DESCRIPTION

Figure 1:
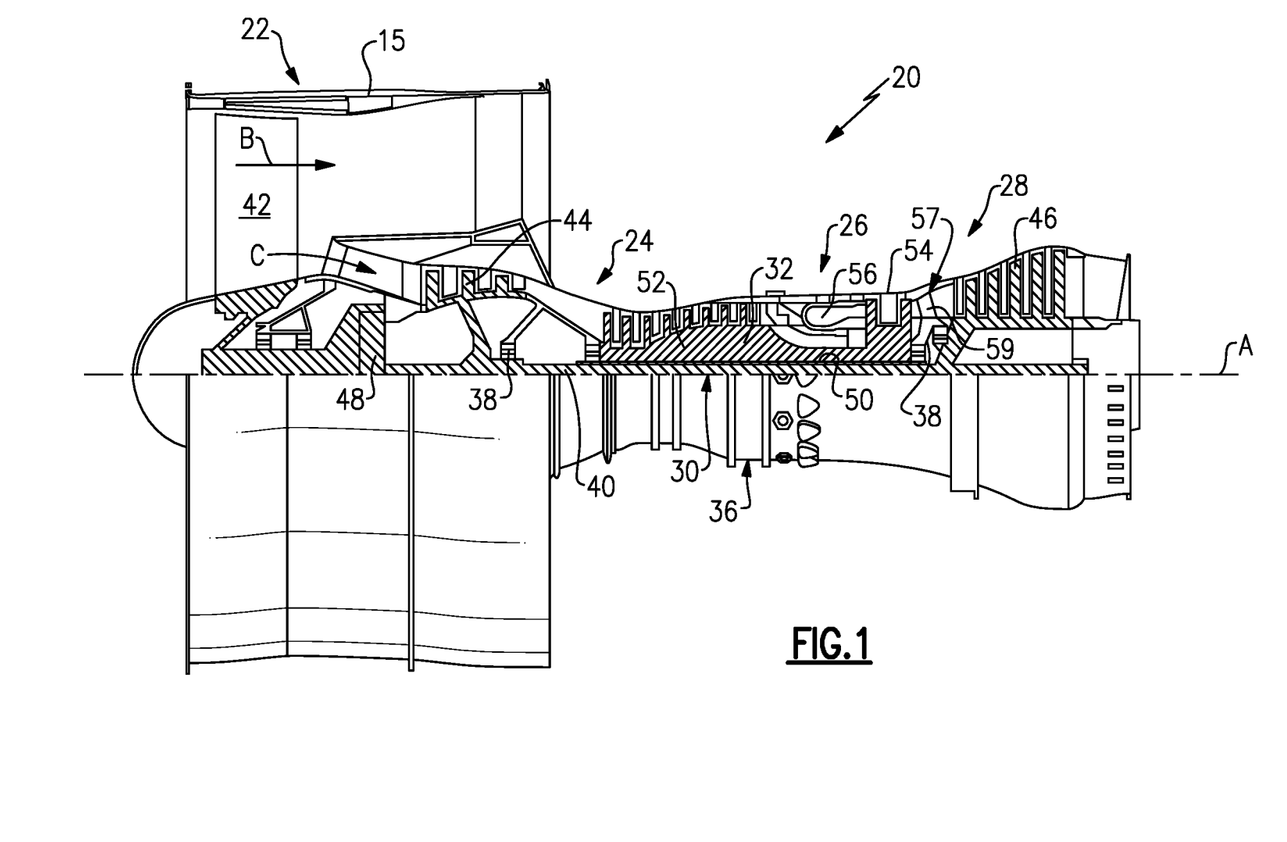
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2A:
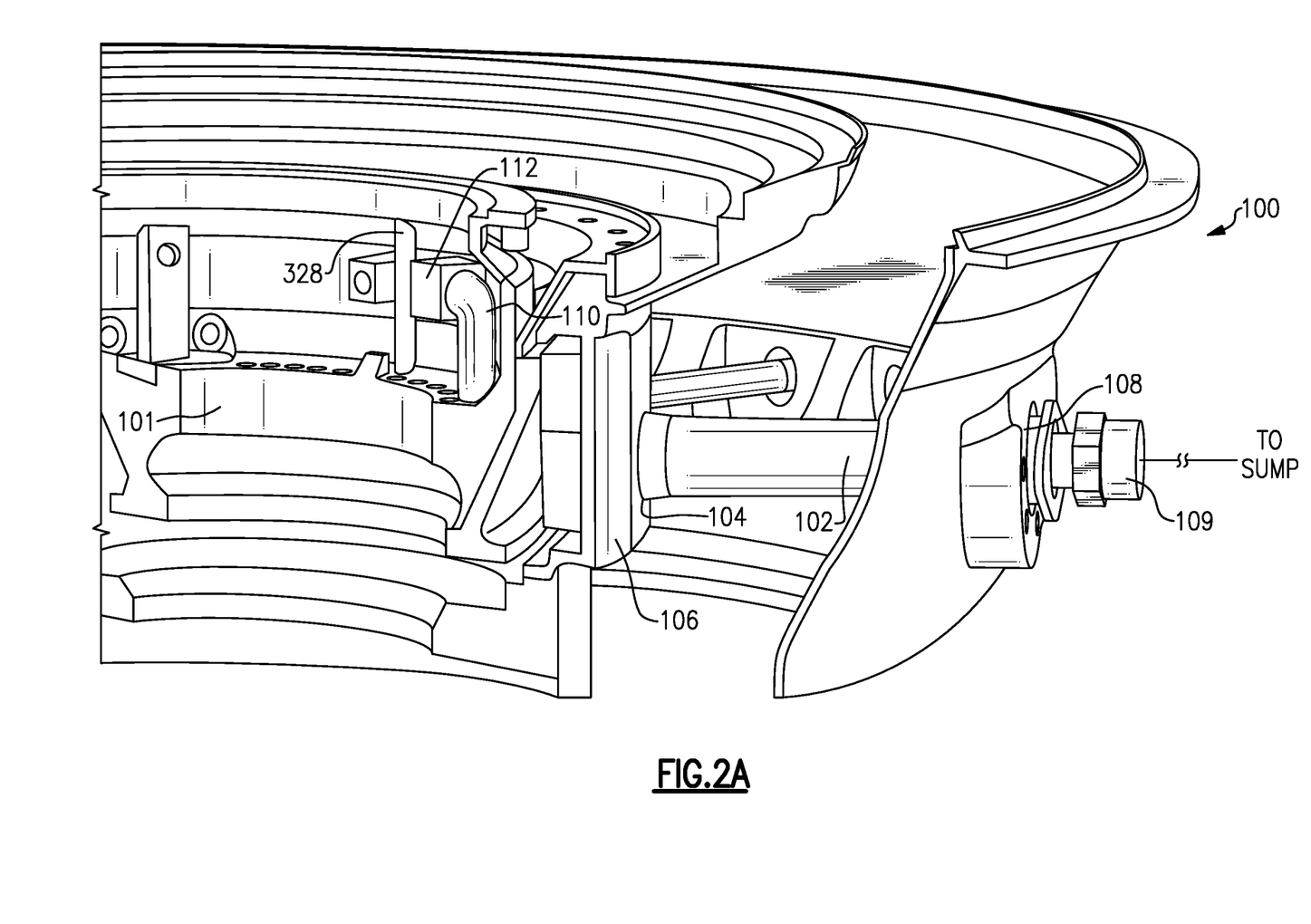
FIG. 2A shows a scavenge tube mounted within a case.

FIG. 2A shows a turbine intermediate case 100 as may be mounted within the gas turbine engine of FIG. 1. As shown, a bearing support 101 may support shafts associated with the rotors in the turbine section. It is known to supply lubricant to various locations in the turbine intermediate case including the bearing area. It is also known to provide a scavenge tube 102 to return the lubricant back to a lubricant sump. The scavenge tube extends into a bracket or housing 106 and seals 104 are located at the area. Internal to the bearing support 101 and the housing 106, the scavenge tube 102 communicates into a scavenge tube end 110 having an inlet 112. The tube 102 has a portion 109 extending through another housing 108, which may also include seals. This is returned to an oil sump located at some remote location.

As is clear from FIG. 2A, the inlet 112 is spaced quite closely to a crossover tube 328 which has a distinct function. Thus, space is limited adjacent the inlet 112.

Figure 2B:
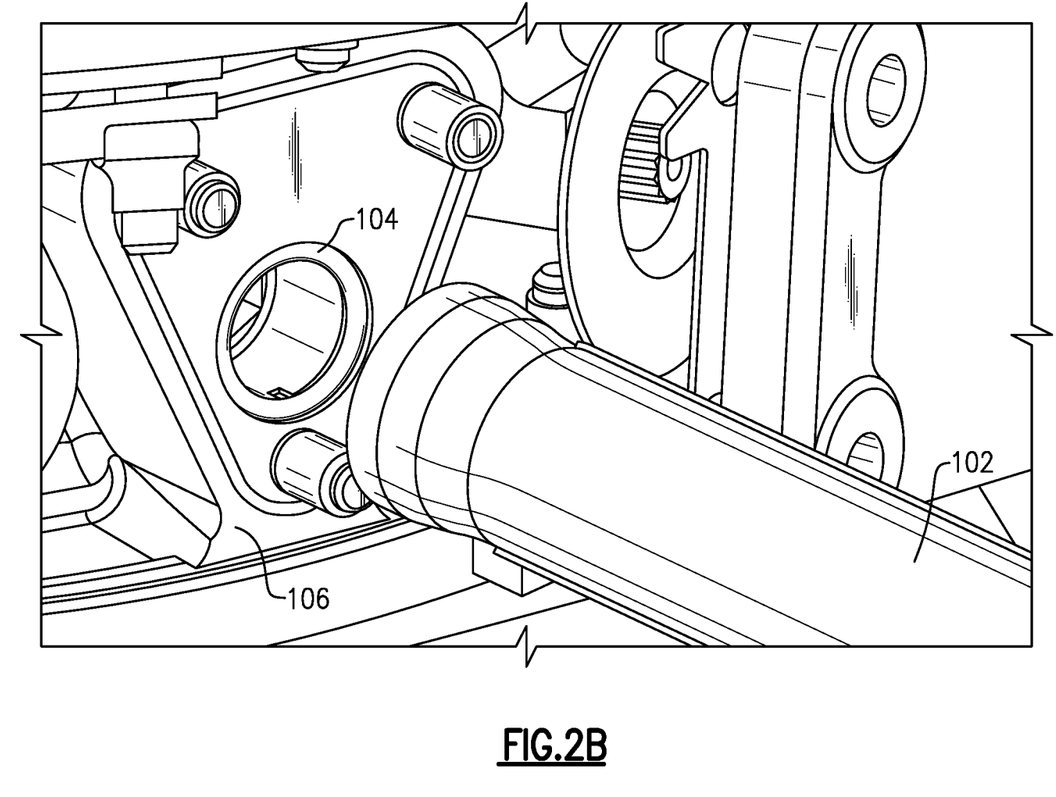
FIG. 2B shows a detail of the scavenge tube.

FIG. 2B shows the tube 102 removed from the housing 106, and illustrates the location of a seal 104. It would be desirable to test the scavenge tube 102/110 for leakage without having to disassemble the system. Thus, a pressure test would be desirable. However, to perform a pressure test, one must seal the inlet 112 and apply pressure to a remote end of the tube 102. While a seal is shown, as mentioned above there are other potential leakage locations to test.

Figure 3A:
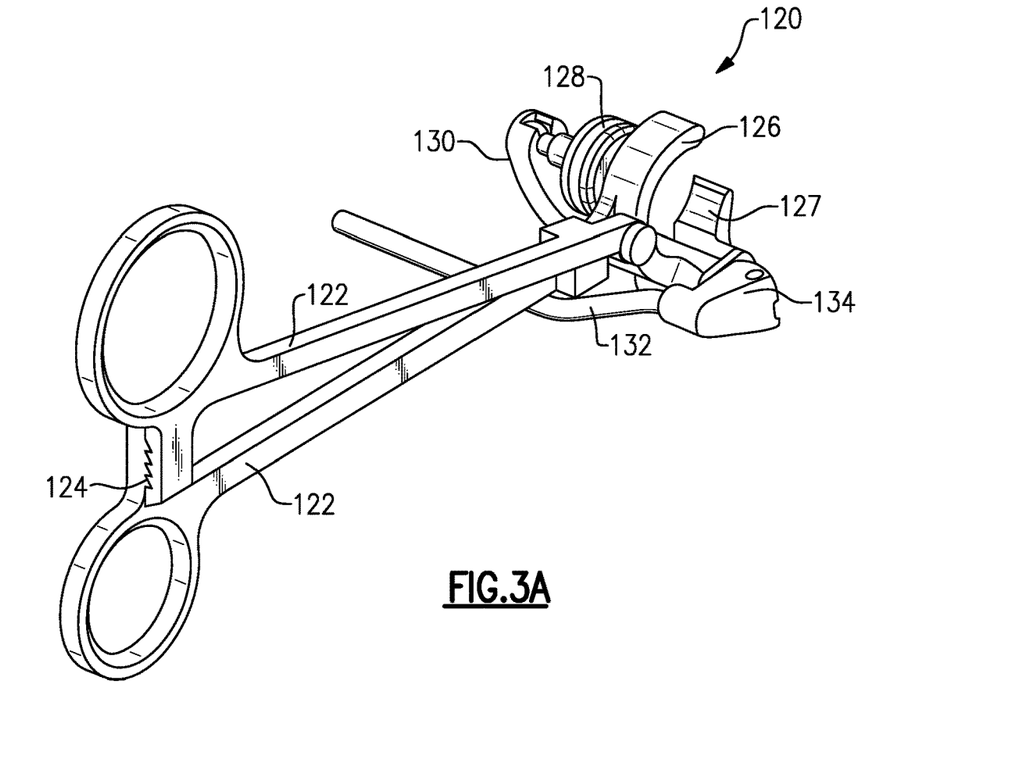
FIG. 3A shows a tool.

FIG. 3A shows a tool 120 have forceps 122 with a ratchet clamping lock 124. Semi-circular grippers 126 and 127 will lock onto the tube 110, as disclosed below. A plug 128 will move into the inlet 112. The plug 128 is mounted into an end 130. An actuation structure 134 is actuated by a lever 132 to cause the plug 128 to move in an axial direction.

Figure 3B:
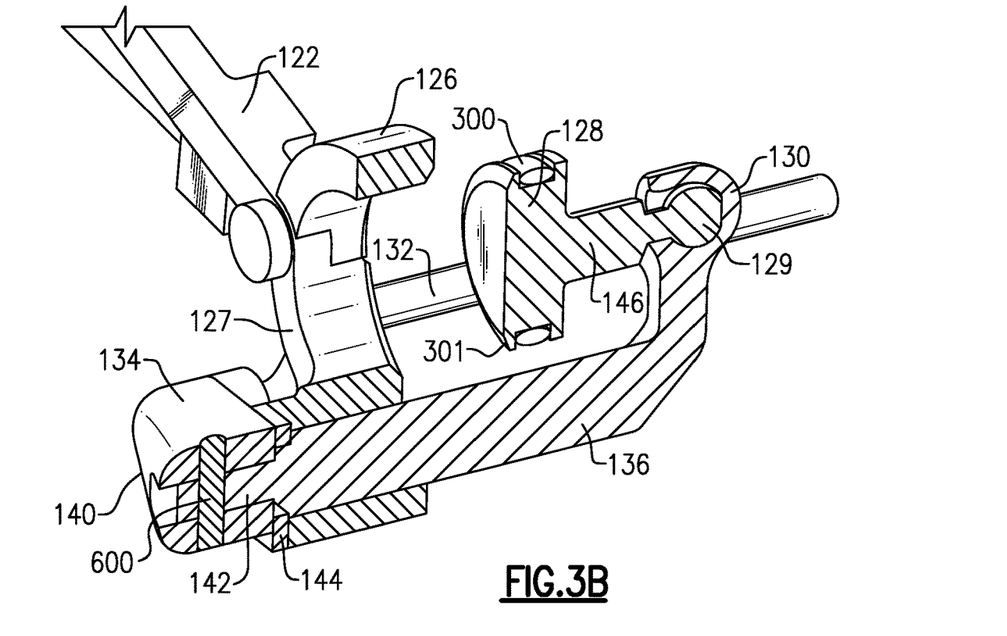
FIG. 3B is another view of the FIG. 3A tool.

FIG. 3B is a crosscut view and shows the actuation structure 134. When the lever 132 is pivoted, it causes the actuation structure 134 to move a portion 140 on an end 142 of an actuator link 136. Actuator link 136 extends to the mount 130 which receives a ball mount 129 associated with the plug 128. A piston 146 connects ball mount 129 to plug 128. A washer 144 is provided to transmit force to gripper vanes 127. An oil ring seal 300 and a chamfer 301 may be included.

Figure 3C:
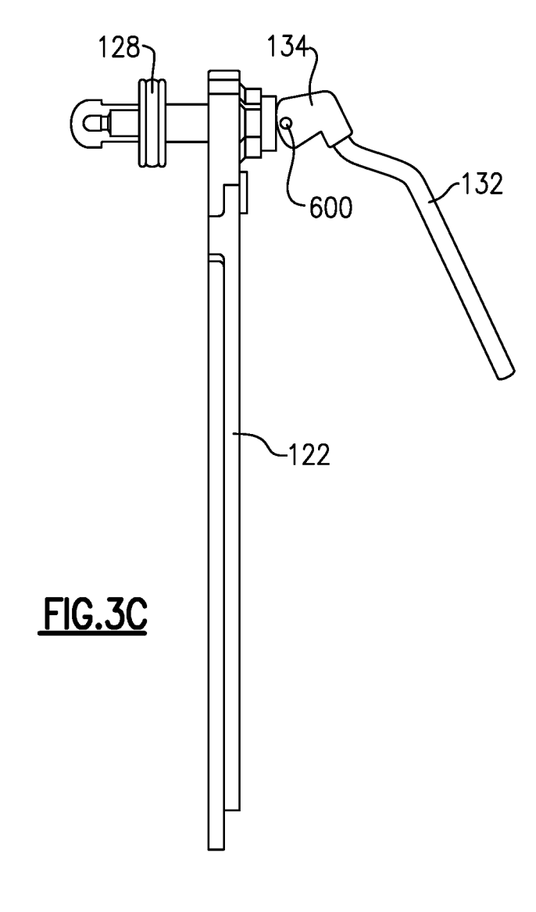
FIG. 3C shows a detail of the tool in a unlocked position.

As shown in FIG. 3C, the lever 132 and the actuation structure 134 is in the non-actuated position.

Figure 3D:
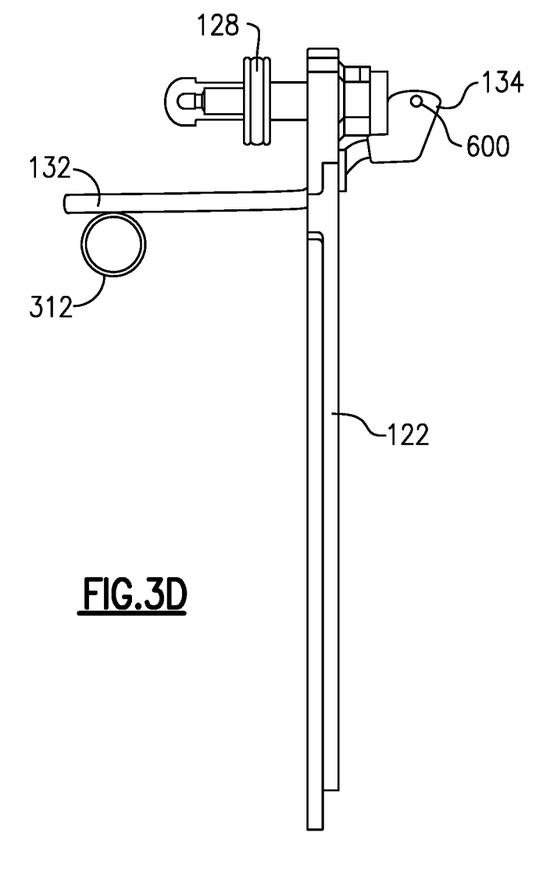
FIG. 3D shows the tool having been moved to the locked position.

FIG. 3D shows the lever 132 having been pivoted clockwise in this view with the actuation structure also pivoting and providing a force against the forceps 122 to draw the seal 128 to the right, in this view. As is clear, as the plug 128 moves to the right, it is moving in an axial direction towards the grippers 126 and 127. A pin 312 locks the lever 132 in this lock or sealing position.

As can be appreciated from FIGS. 3B-3D, pin 600 extends through end 142.

When the lever 132 is pivoted to the FIG. 3D position one can see the pin is moved to the right. Seal 128 is then pulled to the right.

Figure 4A:
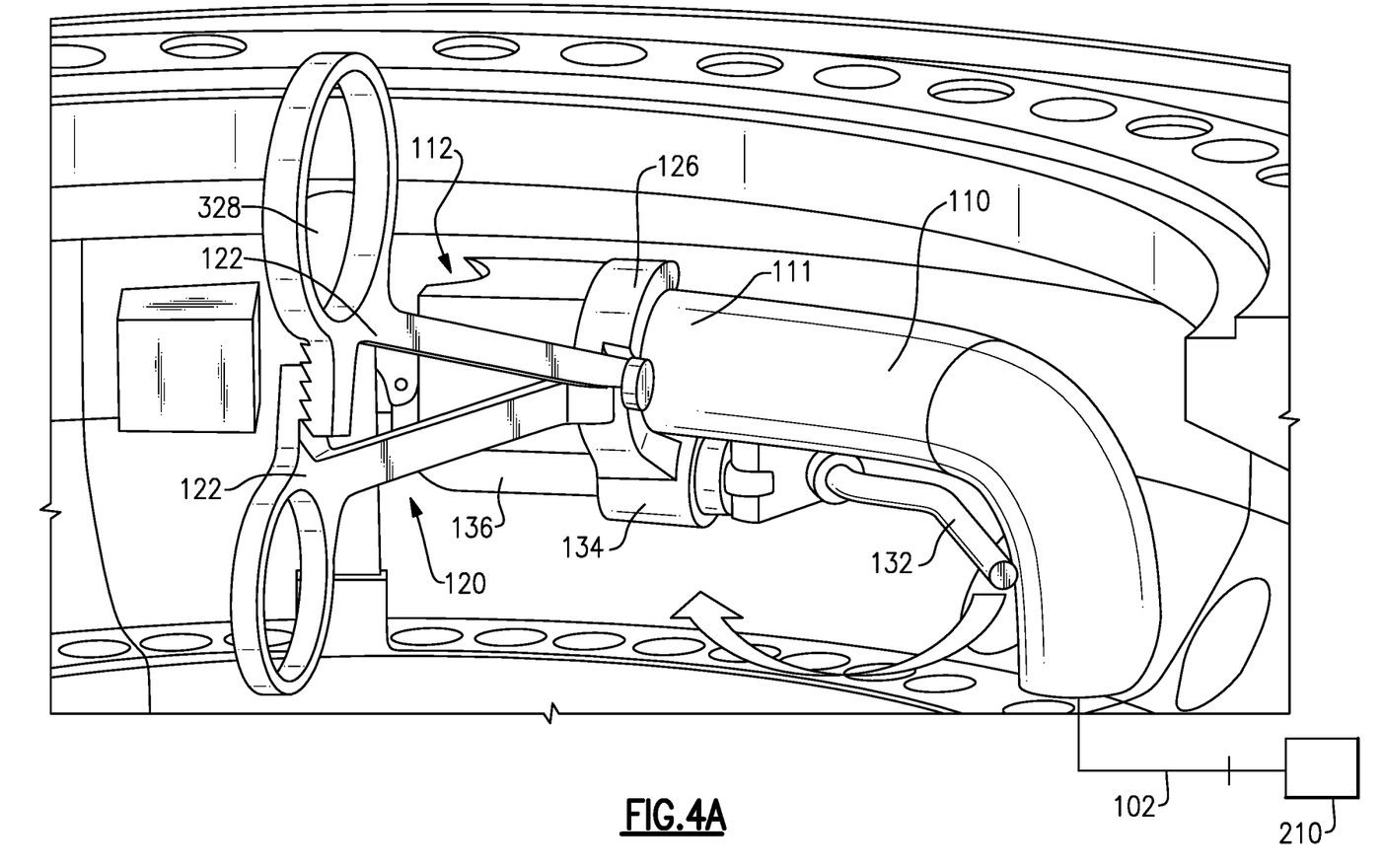
FIG. 4A shows the tool as it sits on a scavenge tube.

FIG. 4A shows a test position for the tool 120. Initially the seal may be brought under the tube 110 and then upwardly into the inlet 112. Then, the forceps 122 could be locked. The forceps 122 have the clamp portions 126 and 127 locked on to an outer peripheral surface 111 of the tube 110 adjacent an end near inlet 112. The plug 128 is received within the inlet 112 sealing the inlet. Although this structure is all close to the tube 128, there is adequate room to mount the tool 120.

Figure 4B:
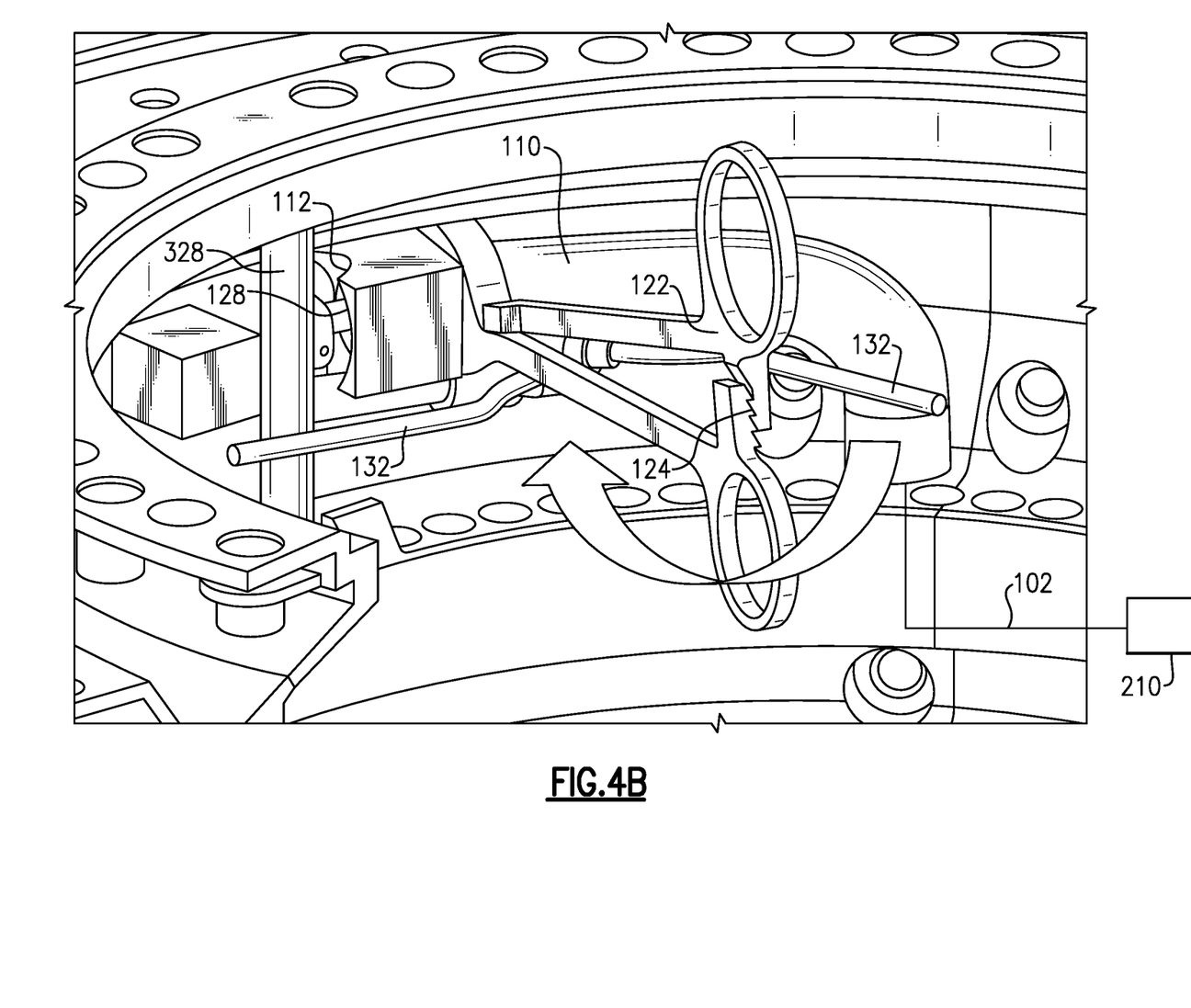
FIG. 4B shows a subsequent step in a method.

FIG. 4B is a distinct view and shows the plug 128 in the inlet 112. The lever 132 is moved to the lock position to cause the plug 128 to be moved into the inlet.

Figure 4C:
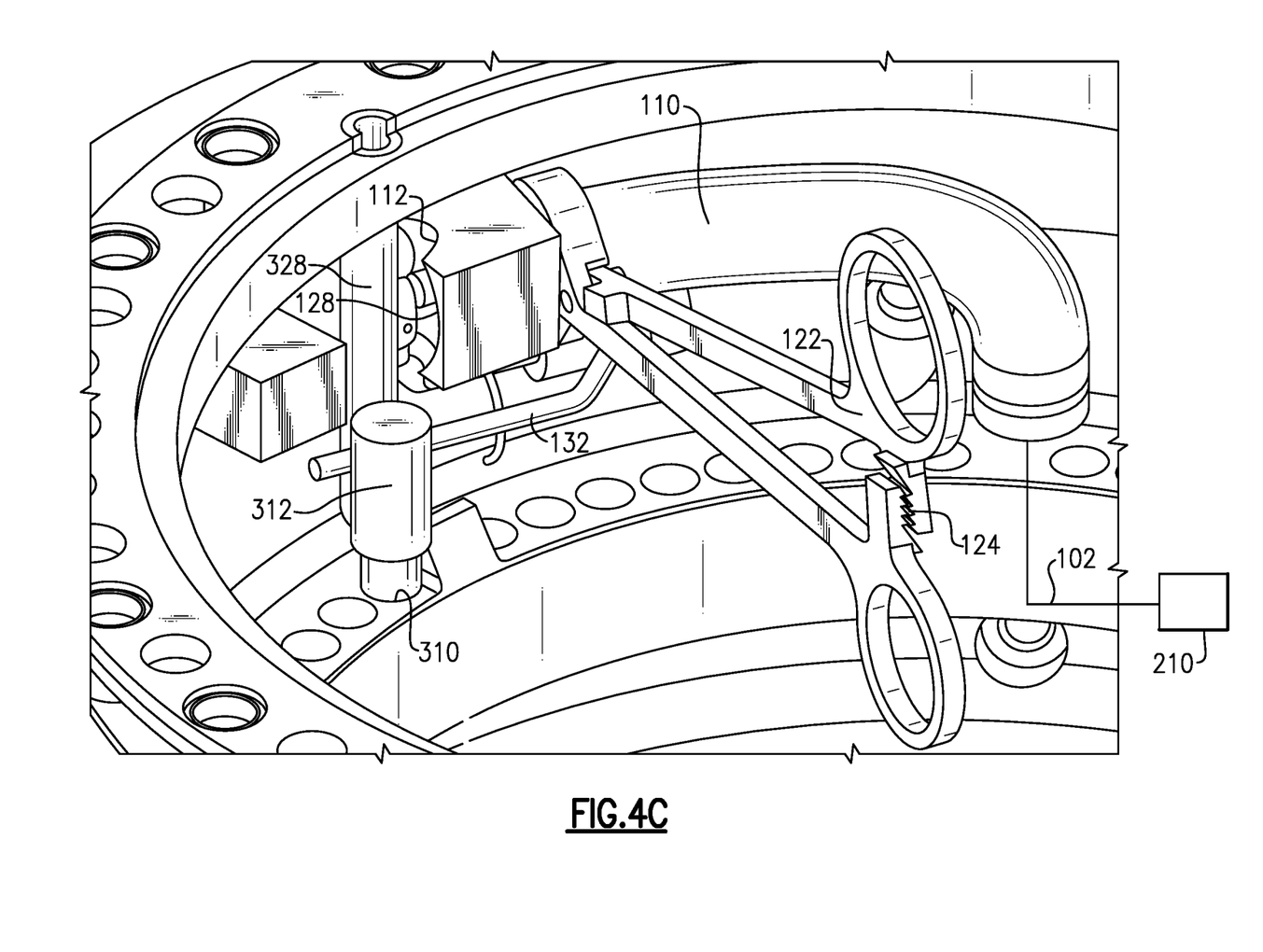
FIG. 4C shows a final assembly step.

FIG. 4C shows a pin 312 inserted in a hole 310 to lock lever 132 at the lock position during testing.

As shown in FIGS. 4A and 4B schematically, the tube 102 is connected to a pressure source 210. Once the tool has sealed the inlet 112, pressure can be applied on the tube 102 and the pressure may be monitored. If the pressure drops more than a predetermining amount in a particular period of time, then a leak may be identified. Once the test is over, the tool is easily removed and the engine may be either repaired or moved back to service, as appropriate.

A method of providing a pressure test on a tube to identify leakage could be said to include the steps of mounting a clamp on a tube adjacent to an end and such that a plug which is part of the tool is positioned to plug an opening in the inlet. The method also actuates the tool to cause the plug to provide a fluid tight seal in the inlet. A source of pressure is applied to the tube. The pressure within the tube is monitored, and a leak is identified should the pressure drop more than a predetermined amount in a particular period of time.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A tool for use in providing a seal on a tube end to allow a pressure test comprising:
   a pair of forceps and a lock for locking said forceps at a particular location, and each of said forceps moving with a semi-circular clamp; and
   a plug mounted and axially moveable relative to said clamps, and a structure for actuating said plug to move axially to seal in a structure to be pressure tested;
   wherein a lever is pivoted to cause said plug to move axially; and
   wherein said lever rotates an actuation structure relative to a cam surface, and such that a link for moving said plug is caused to move axially by rotation of said actuation structure to, in turn, cause said plug to move into and out of an opening on the structure to be tested.

2. The tool as set forth in claim 1, wherein as said plug is caused to move axially by said lever it moves in a direction toward said semi-circular clamps of said pair of forceps.

3. The tool as set forth in claim 1, wherein when said lever rotates said actuation structure it causes the actuation structure to move a portion on an end of an actuator link to cause said plug to move axially.

4. The tool as set forth in claim 3, wherein said actuator link extends to a mount which mounts said plug.

5. The tool as set forth in claim 4, wherein said actuator link receive a ball mount associated with the plug, such that said plug moves as said actuator link moves.

6. A tool for use in providing a seal on a tube end to allow a pressure test comprising:
   a lock for locking a pair of semi-circular clamps;
   a plug mounted and axially moveable relative to said clamps, and a structure for actuating said plug to move axially to seal in a structure to be pressure tested;
   wherein a lever is pivoted to cause said plug to move axially;
   wherein said lever rotates an actuation structure relative to a cam surface, and such that a link for moving said plug is caused to move axially by rotation of said actuation structure to, in turn, cause said plug to move into and out of an opening on the structure to be tested;
   as said plug is caused to move axially by said lever it moves in a direction toward said semi-circular clamps of said pair of forceps; and
   when said lever rotates said actuation structure it causes the actuation structure to move a portion on an end of an actuator link to cause said plug to move axially, said actuator link extends to a mount which mounts said plug and said actuator link receive a ball mount associated with the plug, such that said plug moves as said actuator link moves.

* * * * *